United States Patent Office 3,157,122
Patented Nov. 17, 1964

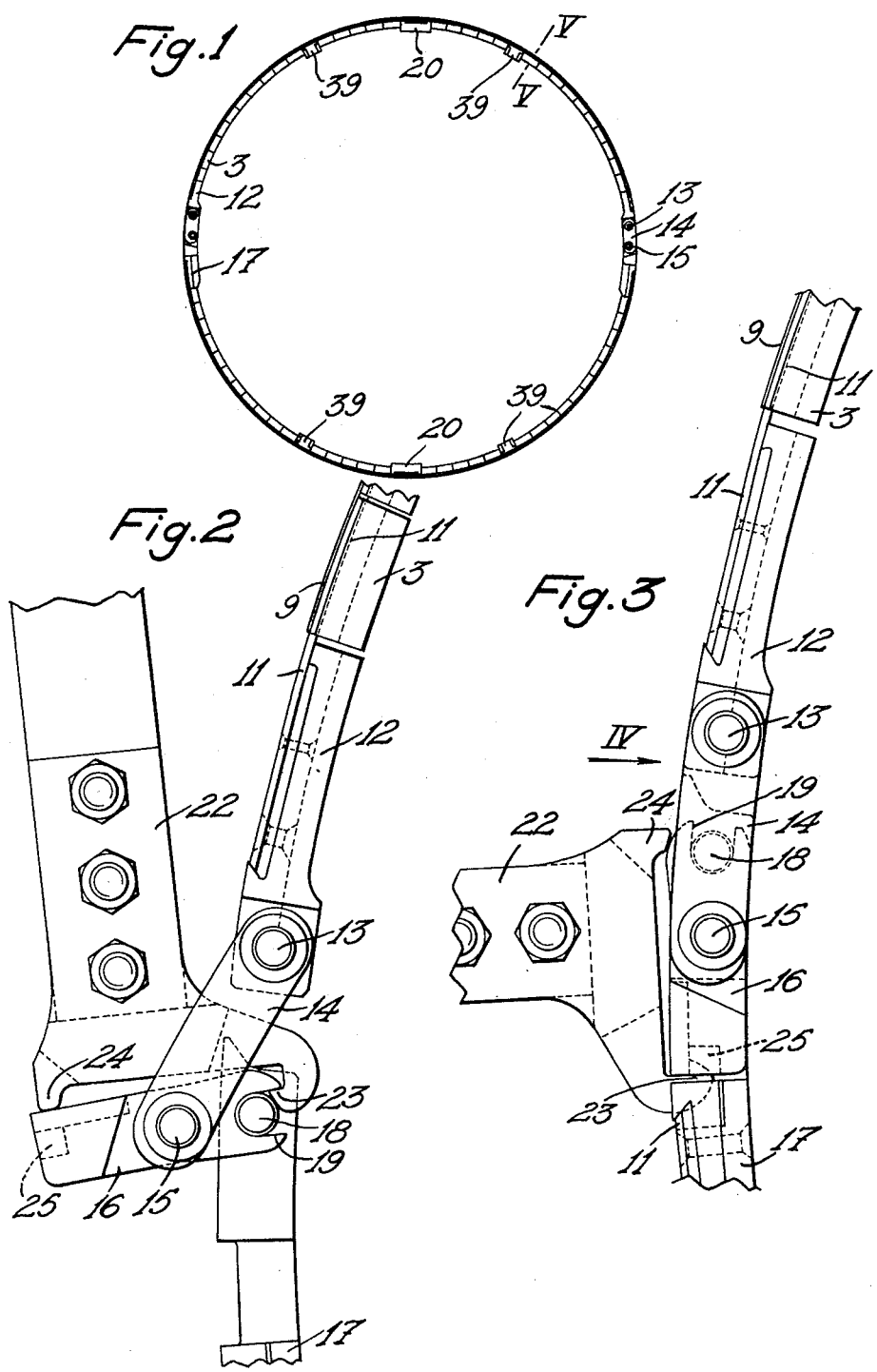

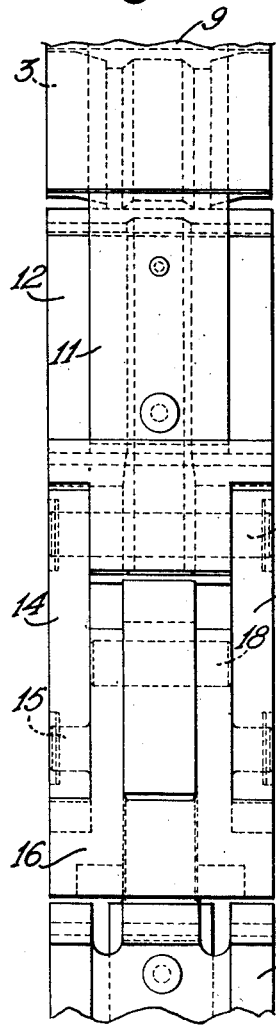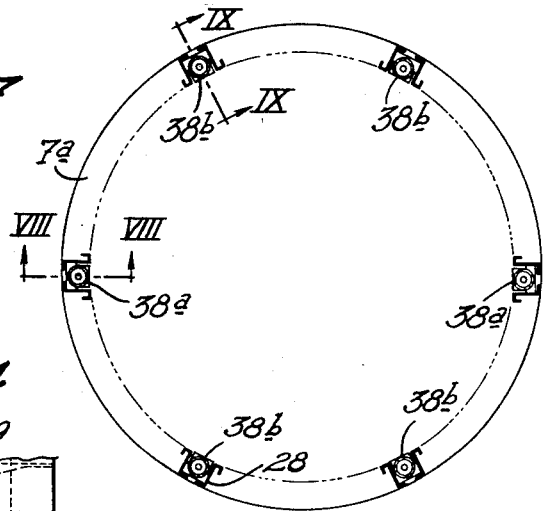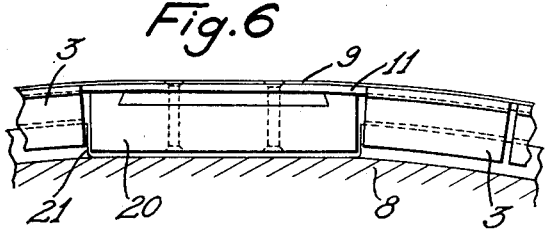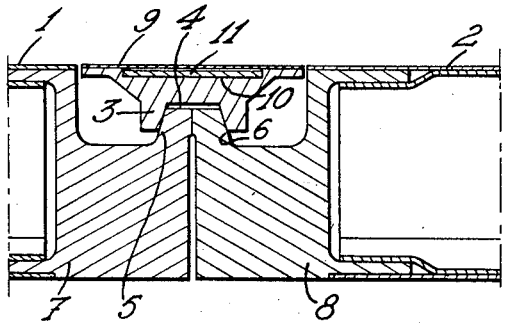

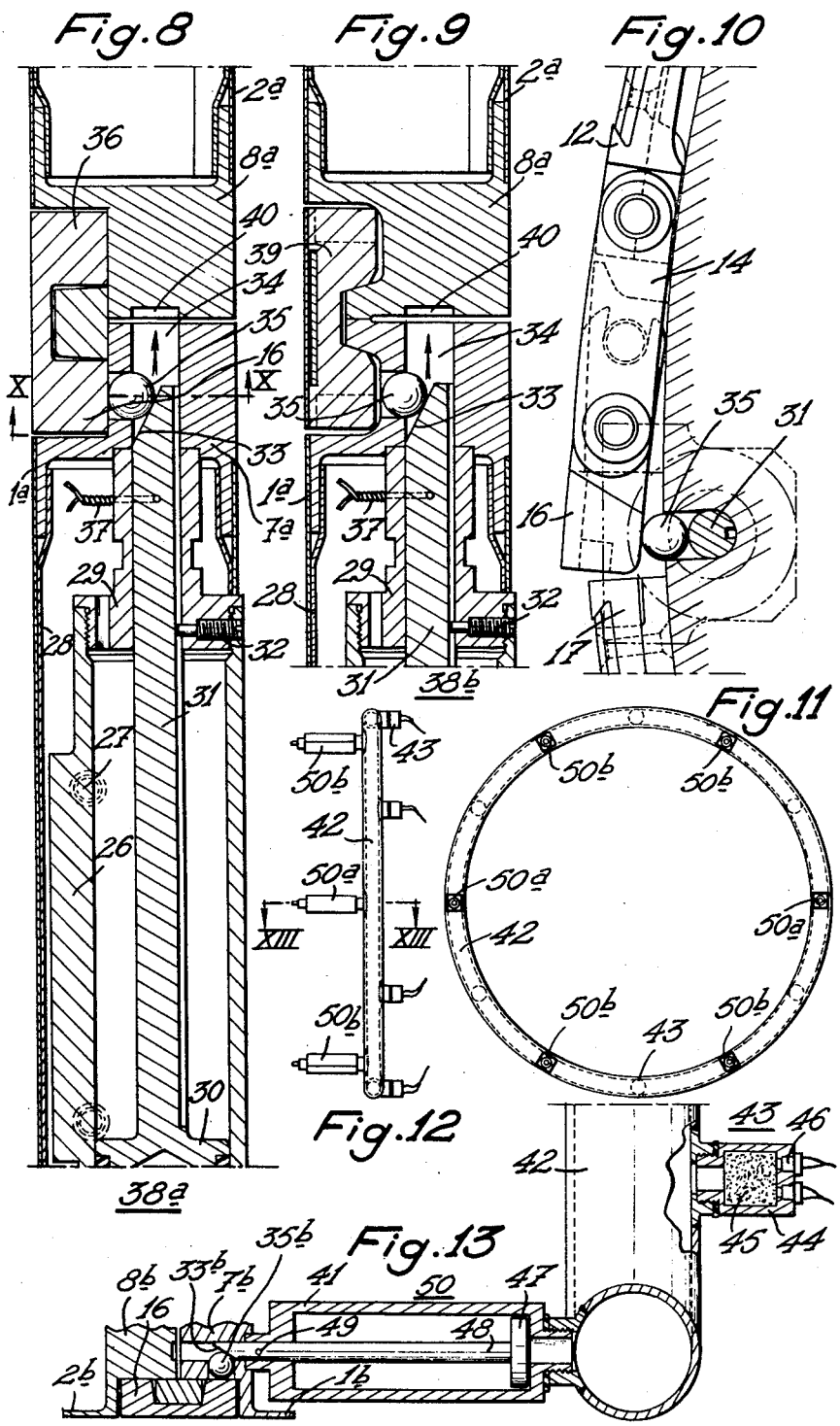

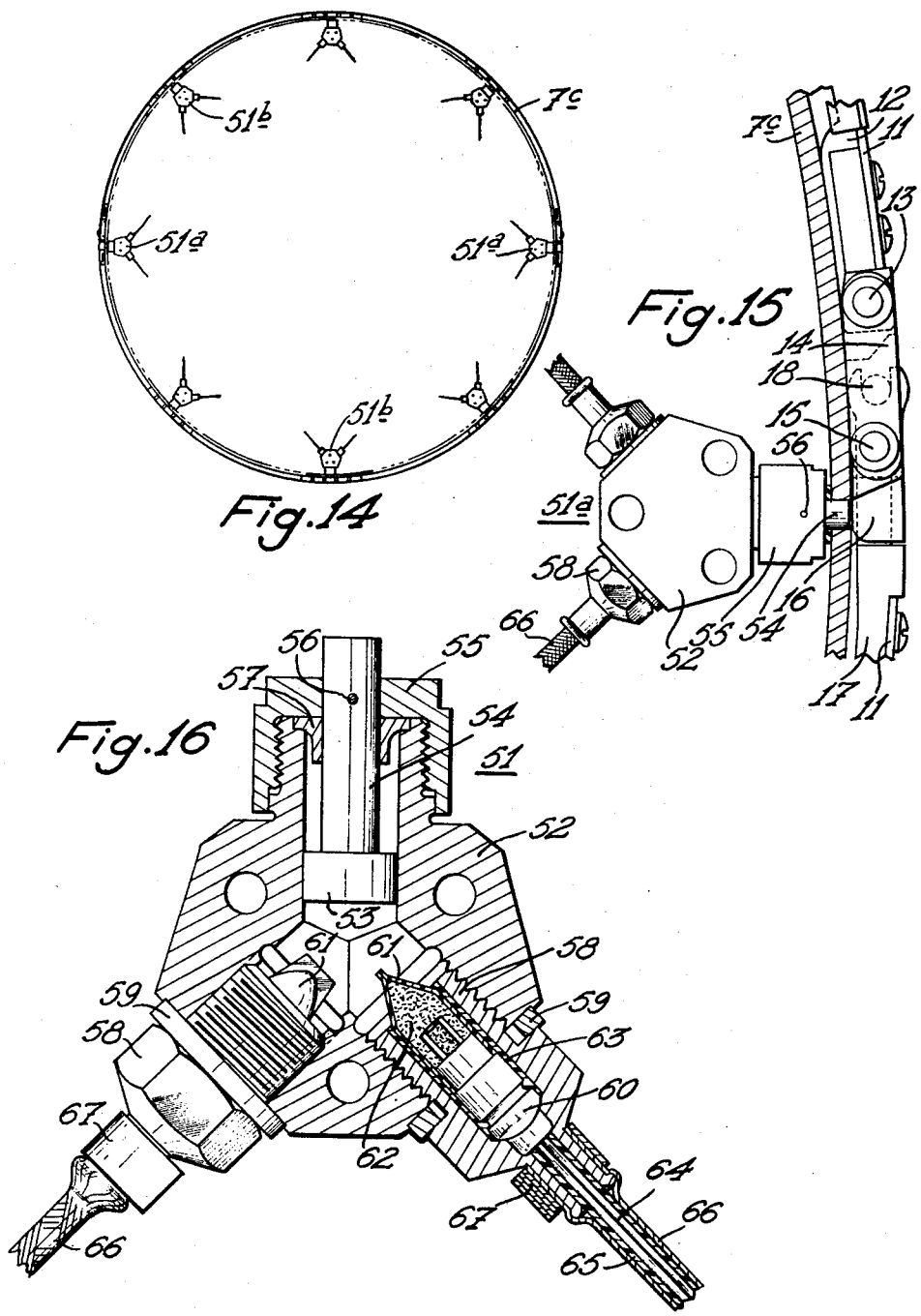

3,157,122
DEVICE FOR HIGH-SPEED ASSEMBLY AND DIS-
ASSEMBLY OF CYLINDRICAL MEMBERS
Marcellin Marie Laurent, Louis Besson, and Edouard
Bartevian, Cannes, France, assignors to Sud-Aviation
Société Nationale de Constructions Aeronautiques,
Paris, France
Filed June 29, 1961, Ser. No. 125,903
Claims priority, application France, July 1, 1960,
831,705
8 Claims. (Cl. 102—49)

The invention relates to means for assembling two circular cylindrical members of substantially identical outer diameter and to means for controlled high-speed disassembly thereof. The invention relates in particular to means for high-speed assembly and disassembly of cylindrical missile body sections designed to separate from one another stage by stage in the course of the missile's flight.

Cylindrical members such as large-diameter pipes have already been assembled together by means of clamping rings taking effect on flanges which are brought into mutual contact and which comprise chamfers or bevels to facilitate clamping of the assembly under the action either of a tightening member operating by tension or of a strap acting upon the ring itself, the tensioning means being a screw- or lever-type device. As is well known, the clamping part of the ring may be caused to take effect upon a plurality of staples distributed along the periphery of the cylindrical members, over the assembling area, said staples forcing against the chamfers.

Recourse has also been had to a ring of this type which is devoid of any projecting areas and which is clamped in position by means of a special lever acting upon a small built-in lever which is immobilized when its central position is overstepped.

The invention has for its object a device for high-speed assembly and disassembly of such large-diameter cylindrical sections as are notably component parts of flying bodies such as missiles, said device being of the type comprising a clamping ring devoid of projecting areas and having a multiplicity of staples which are caused to act upon clamping chamfers embodied on edges in contact of said sections in response to the action of a clamping strap, in which the staples are divided into equal groups and interconnected within each group by a flexible connecting member which leaves a gap between itself and the staples to permit assembly of the corresponding strap element, the strap elements comprising midway along their lengths arrester blocks accommodated in said edges, and said elements being automatically set under tension two by two by arching systems, high-speed disassembly being obtained by means of a set of jacks which operate simultaneously on said arching systems and on intermediate staples in each group, and also, if required, on the cylindrical section to be disassembled, by exerting a thrust against said section.

The staples, which are designed to be of sufficiently small length to impart a certain degree of flexibility to the strap elements, are preferably joined to one another by a thin metal strip in each group.

Each strap element accommodated in the annular gap between the staples in the corresponding group and their connecting thin metal strip consists of a strap of very greate elasticity made of a metal permitting a very great elongation which is preferably not in excess of 80% of the yield strength so as to avoid creep, said metal having a relatively low coefficient of expansion in order to reduce the drop in the strap tension resulting from the kinetic heating sustained by the missile in flight. In actual fact, whereas the strap, being located outside the staples, tends to heat up to a greater extent than the edges of the sections to be assembled, it is protected from the heat flux by the thin metal strip, thereby enabling the temperature differential between strap and edges to be reduced to an acceptable value.

The setting under tension of two successive strap elements is accomplished by means of a small built-in lever which is immobilized when its central position is over stepped under the force exerted by a tool supplying the torque required to effect the setting under tension, the value of which may reach several tons, and enabling dismantling to take place by disassembly of the two strap elements.

The jacks may be operated pneumatically or pyrotechnically, and their action may either be restricted to a simple disassembling of the two sections or be pursued subsequent to disassembly, in order to achieve a setting in motion of the sections relative to each other and thereby ensure a clean and symmetrical separation in relation to their axes.

The description which follows with reference to the accompanying drawings, given by way of example and not of limitation, will give a clear understanding of how the invention may be performed and will bring out further particularities thereof.

In the drawings, FIGURE 1 is a front elevation of a ring according to the invention, used to assemble cylindrical members, said ring being shown in the position it occupies after assembly.

FIGURES 2 and 3 show, on a larger scale, the component parts of the ends of two groups of staples, illustrated in the course of assembly and disassembly respectively.

FIGURE 4 is a fragmentary side view of the ring, as viewed in the direction of the arrow IV in FIGURE 3, the dismantling tool being suppressed.

FIGURE 5 is a detail view of a section through the line V—V in FIGURE 1.

FIGURE 6 is a larger-scale view of an arrester block in its lodging.

FIGURE 7 is a schematic view of the device for ensuring disassembly in flight, executed according to a first embodiment.

FIGURE 8 is a larger-scale section through the line VIII—VIII in FIGURE 7.

FIGURE 9 is a detail of a section through the line IX—IX in FIGURE 7.

FIGURE 10 is a section through the broken line X—X in FIGURE 8, showing the position of controlled dearching of the forked lever.

FIGURES 11 and 12 are front and side views, respectively, of the device for ensuring high-speed separation in flight, executed in accordance with a second embodiment which comprises pyrotechnically-operated jacks.

FIGURE 13 is a larger-scale section through the line XIII—XIII in FIGURE 12.

FIGURE 14 is a front view of a device for high-speed separation in flight, executed according to a further embodiment employing powder-type impulsors.

FIGURE 15 is a larger-scale view of the manner of action of the powder-type impulsor in FIGURE 14 on one of the assembling levers.

FIGURE 16 is a detail view of one of the powder impulsors in FIGURE 14.

Referring now to FIGURES 1 to 6, the device for assembling two cylindrical members 1 and 2 (see FIGURE 5) comprises two groups of arcuate staples 3 which are of truncated V-shape in cross-section for defining an internal groove 4 bounded by two inclined walls designed to make pressure contact with outwardly converging faces 5 and 6 formed at a distance from the outer surfaces of said members on the edges 7 and 8 thereof which are designed to be in contact with each other. The staples 3 of a same group are interconnected by a thin metal strip 9 which, after assembly, lies flush with the outer surface of the cylindrical members 1 and 2. The staples are additionally provided with an external groove 10 for defining between the staples and the thin metal strip 9 a gap 10 inside which a clamping strap element 11 without connection with said staples finds accommodation.

This clamping strap element is fixed by one of its ends to a part 12 bearing a pin 13 about which pivot, on either side of said part 12, two links 14 which themselves bear a pin 15 about which is pivotable a forked lever 16. At its end closest to the strap element succeeding it is fixed a part 17 bearing a pin 18 which engages into the forked part of lever 16 via longitudinal cuts 19 provided therein (FIGURES 2 and 3). The middle part of said strap element is additionally rigidly connected to an arrester block 20 which penetrates into a housing 21 provided in the edges 7 and 8. In this manner, the two adjoining halves of each strap element can be tightened independently and equal elongation of the two strap elements thereby ensured. The outer surface of the arching system formed by elements 12 to 18, after assembly, lies flush with the outer surface of the cylindrical members, as was the case for strip 9, so that the ring thus obtained is devoid of any outward projection.

The setting under tension of two adjoining half straps is effected by means of a wrench 22 terminating in a fork with double claws 23 and a thrust heel 24. As shown in FIGURE 2, the claws 23 are hooked into the longitudinal cuts 19 in lever 16, the heel 24 being pressed against that end of lever 16 which is remote from the cuts, so as to fetch said lever into alignment with the pins 13 and 18 while at the same time immobilizing it by overstepping its central position.

To remove the clamping ring by disassembling the groups of staples, the wrench 22 is turned the other way round and its claws 23 inserted into nicks 25 provided on the end of lever 16 remote from the cuts 19, the heel 24 of lever 22 making thrusting contact in the vicinity of said cuts 19. By pulling in the direction of the pin 13, the lever 16 is fetched back across its central position into the position shown in FIGURE 2, in which it may be disengaged from the pin 18 on the other strap element by sliding said longitudinal cuts 19 off said pin 18.

The strap consisting of the strap elements 11 is freely slidable over the staples and provides a substantially uniform tension over the whole periphery of the ring. Uniform distribution of this tension is facilitated by the provision, substantially half way along the strap elements, of arrester blocks 20 which enable the element consisting of the two half straps to be tensioned independently and equal elongation of the two strap elements to be thereby ensured.

Each strap element consists of a thin metal section chosen to permit a high degree of elongation, not exceeding 80%, say, of the yield strength of the material from which the element is made, in order to avoid creep phenomena and to ensure a relatively low coefficient of expansion. This latter characteristic is designed to minimize the drop in strap tension resulting from kinetic heating in flight, for, being placed on the outside, this strap tends to heat up more than the edges 7 and 8 of the cylindrical members 1 and 2 which are to be assembled together. It may be noted, however, that in the form of assembly described, the strap, positioned between the staples 3 and the strip 9, is protected in part from the heat flux, hereby enabling the temperature differential between the strap 11 and the edges 7 and 8 to be reduced to an acceptable level. Said strap will preferably be made of titanium, cold-worked stainless steel, or superhardened beryllium bronze.

FIGURES 7 to 16 illustrate three different embodiments of the high-speed separating device associated to the assembling ring shown in FIGURES 1 to 6. This separating device comprises a set of pneumatically- or pyrotechnically-actuated jacks which operate simultaneously either to ensure an impulseless clamping of the two members 1 and 2 to be separated, or a form of unclamping wherein said jacks subsequently serve to impart a relative velocity to said two members in order to cause the latter to separate cleanly and symmetrically in relation to their axes.

In the embodiment shown in FIGURES 7 to 10, the high-speed separating device comprises pneumatic jacks to impart this relative velocity to the two members when they separate.

Each jack comprises a body 26 fixed by screws 27 to a stringer 28, perpendicularly to the end face of the bordering portion 7a of the front member 1a. This body is closed off by a part 29 which penetrates into a locating recess embodied in the edge 7a. Inside the body is displaceable a plunger head 30 the rod 31 of which can be orientated by means of a grub screw 32; said rod terminates in a bevelled stem 33 and can slide into a hole 34 provided in the edge 7a. A ball 35, which is in contact with the bevel 33, lies flush with the outer cylindrical face of the edge 7a, with which it communicates via a guiding hole. A calibrated locking wire 37 holds the rod 31 in position as long as the fluid under pressure does not act upon the plunger head 30. Two jacks 38a are disposed opposite the clamping ring locking levers 16, and four other such jacks 38b are disposed opposite four ejection heels 39 which are respectively carried two at a time by each group of staples, one on each side of the arrester blocks 20. These six jacks are preferably spaced at equal angular intervals in order to ensure symmetrical action.

When the fluid under pressure acts upon the plunger heads 30 of the jacks 38a, the locking wires 37 are sheared, whereupon the bevels 33 displace the balls 35 in their guiding holes, and said balls then thrust against the levers 16 of the two devices which effect locking by arching, and unclamp them. Due to its elasticity, the strap 11 tends to eject itself of its own accord. However, should the staples jam against the chamfers 5 and 6 on the edges 7a and 8a, each of the four jacks 38b provides, through the medium of its ball 35, an extra sideway thrust on the ejection heels 39, at four different points on the strap.

As this operation takes place in a few hundredths of a second, the jack rods 31 pursue their stroke and subsequently come into contact, at six different points, against the bottoms of the holes 40 provided in the edge 8a of the rearward member 2a, thereby causing the latter to be thrust away from the forward member 1a. The number of jacks, their stroke length and the force they develop are so chosen in terms of the masses to be displaced as to produce a speed of separation of the two members which will ensure that such separation takes place cleanly.

The relative speed of the two members has intentionally been chosen high, so that the gap existing between them after a few tenths of a second should be sufficient for the dynamic pressure exerted against the forward edge of the rear member to provoke definitive separation of the two members.

In the embodiment shown in FIGURES 11 to 13, the jacks ensuring disassembly of the clamping ring and providing the separating impulse for the two members are actuated by pyrotechnic means.

In this particular embodiment, the jacks, the bodies 41 of which are centered on the edge 7b of the front member 1b, are connected to a hollow ring 42 on which are mounted powder-type gas generators 43 comprising a body 44 containing a powder grain 45 and igniters 46. The ring 42 serves to collect and distribute to the jacks the expanding gas generated by the explosion of the powder. The rods 48 of these jack plungers 47 are fixed to the bodies 41 through the medium of calibrated shear-pins 49 and terminate in bevels 33b cooperating with the balls 35b. Operation of the jacks, which are divided as in the case of FIGURES 7 to 10 into a group of two jacks 50a acting upon the locking levers of the arching device and into a further group of four jacks 50b acting upon ring-ejecting heels, is identical and will not be described afresh.

It is to be noted that the jacks 38 in the embodiment shown in FIGURES 7 to 10, instead of being supplied with compressed fluid, could be supplied from a manifold similar to the ring 42, designed to receive and distribute the gas produced by the explosion of the powder-type gas generators.

In the embodiment shown in FIGURES 14 to 16, the high-speed separating device merely generates impulses for detaching the clamping ring and separating the strap elements from the groups of associated staples, without applying an impulse tending to thrust away the member to be separated.

To this end, use is made of small powder impulsors 51 arranged radially on a frame located at the edge of the casing 7c, two of these impulsors 51a having for function to unlock the locking levers 16 which tension the strap elements, while six other impulsors 51b have for function to unclamp the staples by a radially exerted force which ejects the strap. These impulsors are accommodated in a housing which shelters them from the kinetic heating generated during flight, in order to obviate any risk of auto-ignition of the powder above a certain temperature.

Each impulsor consists of a body 52 bolted to the frame of the casing 7c and designed to withstand the pressure of the gas generated by explosion of the powder. Inside this body is slidably fitted a plunger 53 the stem 54 of which is threaded through and clamped to a plug 55 by a calibrated shear-pin 56, the purpose being to provoke a rise in gas pressure and to reduce impulse scatter.

The projecting tip of the stem 54 acts either upon the lever 16 used to lock the strap-element tensioning device (as shown in FIGURE 15), or upon an intermediate staple, or upon an ejection heel similar to the heel 39 used in the embodiment described precedingly. A damping seal 57 inserted between the body 52 and the plug 55 is designed to prevent any risk of shearing the plunger head 53 in the event of accidental triggering of the impulsor under no-load conditions.

In the impulsor body are additionally accommodated two electrically operated powder igniters. Each such igniter comprises a support 58 screwed into the body 52 with an interposed washer 59. Inside this body is a pyrotechnic igniter comprising a puff fuze 60 glued with varnish to an igniter sheath 61 containing black powder 62. The complete assembly is inserted into the support 58 after the latter has been inhibited with a putty-based coating 63, compounded basically from some synthetic resin of the epoxy class for instance, an example being the resin known by the registered trademark "Araldite." The puff fuze 60 is connected to two insulated electrical leads 64 enclosed in an insulating sheath 65 made of PVC for example, the whole assembly being in turn protected by an outer enclosing sheath 66 secured by a clip 67 to the support 58. Each powder impulsor is fitted with two igniters in order to improve reliability, one being energized by the normal electric power circuit of the flying device, the other by its stand-by circuit. Since the manner of operation of these impulsors is self-evident from the foregoing description, no further description will be given.

It is obvious that, without departing from the scope of the present invention as defined in the appended claims, many modifications suggested by technical considerations or practical applications could be made to the embodiments described hereinabove. In particular, the powder type gas generators in the embodiment shown in FIGURES 11 to 13 comprise two igniters to increase reliability. Similarly, these powder generators are preferably accommodated in a housing which shelters them from the kinetic heating sustained in flight, in order to prevent auto-ignition of the powder. Furthermore, the number of groups of staples or of strap elements could exceed two, in which case the complete system would comprise as many unclamping jacks for the small tensioning levers as there are groups, the number of jacks used to detach the staples being variable according to the type and length of each strap element.

What we claim is:

1. A device for high-speed assembly and disassembly of cylindrical members having a relatively large diameter such as the component parts of flying devices such as missiles, comprising a multiplicity of arcuate staples surrounding the contacting edges of the cylindrical members and divided up into equal groups, each staple having an external arcuate groove and being of an internal truncated V-shape in cross-section for engaging outwardly converging faces formed at a distance of the outer surface of said two cylindrical members on said contacting edges, a thin metal strip secured on the outer surface of the staples of each group and defining gaps with the external arcuate grooves thereof, a strap element traversing the gaps of the staples of each group without connection with said staples, an arresting block secured on the middle part of each strap and engaging a housing formed in the contacting edges of said cylindrical members, conventional dismountable arching systems for interconnecting the adjacent ends of two successive strap elements and for tightening independently the two adjoining halves of said successive strap elements, whereby the strap elements freely slide over the staples and provide a substantially uniform tension over the whole periphery of the ring formed by said staples, strips, strap elements and arching systems without inducing any local deformation of said cylindrical members, the outer surfaces of said arching systems and strips lying flush with the outer cylindrical members, after assembly, so that said ring is devoid of any outward projection, a set of jacks carried by the front cylindrical member in alignment with said arching systems and with intermediate staples of said groups, a source of fluid under pressure, and means for simultaneously connecting said source with said jacks in order to obtain a high-speed separation of said members by the simultaneous action of said jacks on said arching systems and intermediate staples.

2. A device according to claim 1, wherein each strap element consists of a metal having a very great elasticity and providing a high degree of elongation, preferably not exceeding 80% of the yield strength, in order to avoid creep, said metal additionally having a relatively low coefficient of expansion.

3. A device according to claim 1, wherein each arching system interconnecting the adjacent ends of two successive strap elements comprises a piece secured at the end of one strap element, two links pivotally mounted on said piece, a forked lever pivotally mounted on said links opposite their pivotal point on said piece and formed with longitudinals cut at one of its free ends, a second piece secured at the end of the other strap element, and a pin carried by said second piece to be engaged by the longitudinal cuts of said forked lever when the other free end of said lever pivots towards said other strap element in order to overshoot the central position of said lever.

4. A device according to claim 3, wherein the jacks and the source of fluid under pressure comprise a multiplicity of impulsors radially disposed within the ring in alignment with the other lever free ends of the arching systems and the intermediate staples of the groups of staples, respectively, each impulsor comprising a body, a plunger slidably mounted inside said body and having a radially directed stem projecting from said body, a calibrated shear-pin retaining said stem with respect to said body, two independently electrically operated powder igniters housed in said body, and a damping seal surrounding said stem and inserted between said body and said plunger.

5. A device for high-speed assembly and disassembly of cylindrical members having a relatively large diameter such as the component parts of flying devices such as missiles, comprising a multiplicity of arcuate staples surrounding the contacting edges of the cylindrical members and divided up into equal groups, each staple having an external arcuate groove and being of an internal truncated V-shape in cross-section for engaging outwardly converging faces formed at a distance of the outer surface of said two cylindrical members on said contacting edges, a thin metal strip secured on the outer surface of the staples of each group and defining gaps with the external arcuate grooves thereof, a strap element traversing the gaps of the staples of each group without connection with said staples, an arresting block secured on the middle part of each strap and engaging a housing formed in the contacting edges of said cylindrical members, conventional dismountable arching systems for interconnecting the adjacent ends of two successive strap elements and for tightening independently the two adjoining halves of said successive strap elements, whereby the strap elements freely slide over the staples and provide a substantially uniform tension over the whole periphery of the ring formed by said staples, strips, strap elements and arching systems without inducing any local deformation of said cylindrical members, the outer surfaces of said arching systems and strips lying flush with the outer cylindrical members, after assembly, so that said ring is devoid of any outward projection, a set of longitudinal jacks carried by the front cylindrical member in contacting engagement with said arching systems and with intermediate staples of said groups, a source of fluid under pressure, and means for simultaneously connecting said source with said jacks in order, on the one hand, to obtain a high-speed separation of said members by the simultaneous action of said jacks on said arching systems and intermediate staples and, on the other hand, after disassembly of the high-speed assembly and disassembly device, to impart a relative velocity to said cylindrical members whereby the latter may be separated cleanly and symmetrically in relation to their axes.

6. A device according to claim 5, wherein each arching system interconnecting the adjacent ends of two successive strap elements comprises a piece secured at the end of one strap element, two links pivotally mounted on said piece, a forked lever pivotally mounted on said links opposite their pivotal point on said piece and formed with longitudinal cuts at one of its free ends, a second piece secured at the end of the other strap element, and a pin carried by said second piece to be engaged by the longitudinal cuts of said forked lever when the other free end of said lever pivots towards said other strap element in order to overshoot the central position of said lever.

7. A device according to claim 6, wherein the rear edge of the front cylindrical member has in alignment with the other lever free ends of the arching systems and with the intermediate staples of the staple groups longitudinal holes and radial outer holes communicating with said longitudinal holes, and wherein each jack comprises a longitudinally disposed body, a plunger slidably mounted within said body and having a rod terminating in a bevelled stem and displaceable in the corresponding longitudinal hole of the edge of the front cylindrical member, a calibrated locking wire for holding said rod in position with its bevelled stem in register relationship with the corresponding radial hole, and a ball guided by said radial hole, in contacting engagement with said bevelled stem and lying flush with the outer cylindrical face of said rear edge as long as said rod is held in position, whereby when the fluid under pressure acts upon the plungers of the jacks the locking wires are sheared and the balls thrust against the other lever free ends of the arching systems and against the intermediate staples for disassembling the ring, then the jack rods pursuing their stroke through the longitudinal holes come into contact with the front edge of the rear cylindrical member thereby causing said rear member to be thrust away from the front member.

8. A device according to claim 7, wherein the jacks are pyrotechnically operated and wherein the source of fluid under pressure comprises a hollow ring connected to the jacks, and powder-type gas generators mounted on said ring and equipped with independently operating igniters.

References Cited in the file of this patent

UNITED STATES PATENTS

| | | |
|---|---|---|
| 2,809,584 | Smith | Oct. 15, 1957 |
| 2,959,129 | Warren | Nov. 8, 1960 |
| 2,967,482 | Toomey | Jan. 10, 1961 |
| 2,981,187 | Riordan et al. | Apr. 25, 1961 |
| 2,996,316 | Terhune | Aug. 15, 1961 |

FOREIGN PATENTS

| | | |
|---|---|---|
| 569,547 | Canada | Jan. 27, 1959 |
| 735,271 | Great Britain | Aug. 17, 1955 |